A. SNYDER.
FRUIT DRIER.

No. 48,733.   Patented July 11, 1865.

Witnesses
Theo Tusch
Wm Breuer

Inventor.
A. Snyder
per Munn & Co
Attorneys.

UNITED STATES PATENT OFFICE.

ADAM SNYDER, OF CLYDE, OHIO.

FRUIT-DRIER.

Specification forming part of Letters Patent No. 48,733, dated July 11, 1865.

*To all whom it may concern:*

Be it known that I, A. SNYDER, of Clyde, in the county of Sandusky and State of Ohio, have invented a new and useful Improvement in Apparatus for Drying Fruits; and I do hereby declare that the following is a full, clear, and exact description thereof, which will enable others skilled in the art to make and use the same, reference being had to the accompanying drawings, forming part of this specification.

The present invention consists in forming an apparatus for drying fruits—such as apples, pears, peaches, &c.—of a series of two or more chambers or receptacles placed one above the other, and with communication between each and every one, the lower one of which is placed or fitted upon any ordinary cooking or other stove, and has in its upper portion or plate one or more apertures, through which the heat from the stove can pass upward to the next chamber above through perforations in its bottom plate, in which chamber the fruit to be dried is placed, and so on in a similar manner through any desired number of fruit-chambers. To the lower chamber, or the one in direct communication with the stove, cold air is admitted through any suitable aperture communicating with the external air, and, becoming heated, also passes up through the fruit-chambers, as described, the admission of cold air to the chamber and the passage of heat therefrom to the fruit-receptacles being regulated at pleasure by means of any suitably-arranged slides for opening or closing the respective inlet or exit apertures; and to still further regulate the degree of heat of the hot air, cold air may be admitted to the same previous to its entrance into the fruit-chambers, and after it has left the heated chamber of the apparatus directly over the stove, through any suitable aperture or apertures communicating with a properly-arranged chamber between the two.

Figure 1:
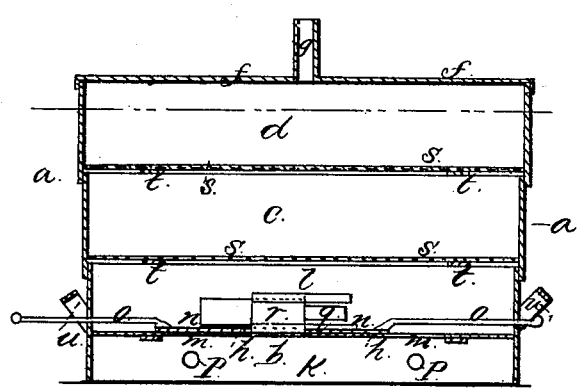
Figure 2:
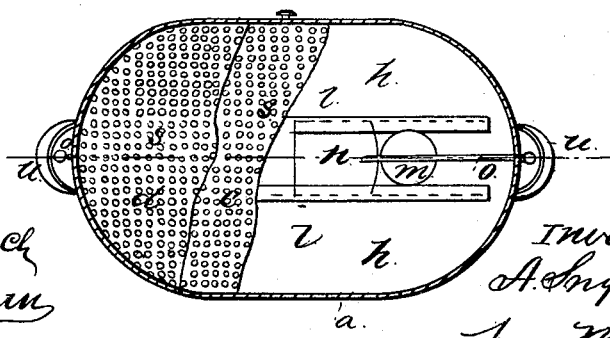

In accompanying plate of drawings my improvement is illustrated, Figure 1 being a central longitudinal vertical section of a fruit-drying apparatus; Fig. 2, a view with the top removed, showing two perforated division-plates broken and arrangement of slides for closing the hot-air port to fruit-chambers.

$a\ a$ represent my apparatus, made of sheet tin, copper, iron, or any other suitable material, and of an oval, square, circular, or any desired shape, consisting of three or more distinct and separate chambers, $b\ c\ d$, one above the other, the upper one, $d$, of which has a top or covering plate, $f$, provided with a short pipe, $g$. The lower chamber, $b$, is divided by a partition-plate, $h$, extending across the same at or near its center, into two chambers, $k$ and $l$, communicating with each other through apertures $m\ m$ in plate $h$, said apertures being each provided with a covering-slide, $n\ n$, attached to a rod, $o$, extending outside of the chamber $b$, whereby they can be partially or entirely closed, as may be desired.

$p\ p\ p$, &c., represent a series of apertures in lower chamber, $k$, of double chamber $b$, communicating with the external air, which also may be provided with suitable closing or opening slides, and $q$ an aperture in upper chamber, $l$, provided with a slide, $r$, for opening or closing the same, also communicating with external air; $s\ s$, two perforated horizontal plates, one placed in each chamber $c$ and $d$, resting upon cross-braces $t\ t$, &c., of the same, at or near the bottom edges thereof; $u\ u$, handles attached to lower portion of apparatus, for convenience in lifting or removing the same from one place to another.

The apparatus formed as above described is placed or fitted upon any suitable cooking or other stove, with its lower chamber, $k$, in direct communication with the heat from the the same and with the fruit desired to be dried placed in the upper chambers, $c$ and $d$. The heat from the stove, with the apertures $n\ n$ open, necessarily passes upward through the same into the chamber $l$ above, and from thence through the perforated plate $s$ into and through the fruit placed upon the same in the chamber $c$, and then through the other, $d$, and finally out at the pipe $g$ into the room or chamber, as may be desired. The passage of the hot air, as described, through each chamber containing the fruit necessarily absorbs and dries the moisture contained therein, carrying it out of the apparatus through the delivery-pipe thereof, which operation may be continued until all or the desired portion of the moisture contained in the fruit is removed therefrom, when it can be taken out of the apparatus through any suit ably arranged doors opening into each chamber, or by forming the separate chambers in such a manner that they can be easily detached from each other. The passage of the hot air to the fruit-chambers can be regulated at pleasure by opening or closing the delivery-apertures $n$ $n$ therefor to the same, as hereinbefore described, and the same with the admission of cold air to the chamber $k$ in contact with the stove through the apertures $p$ $p$, &c., thus increasing or decreasing the currents of hot air to the fruit-chambers, and that, furthermore, if desired to cool the heated currents passing from the hot-air chamber to the fruit-chamber, the aperture $q$, opening into the intermediate chamber, $l$, can be opened to the desired degree by simply moving its sliding cover.

Although I have described my apparatus as composed of three chambers, two of which are fruit-chambers and one a hot-air chamber, it is evident that the chambers may be increased in number at pleasure without departing from the principles of the present invention.

Having thus described my invention, I claim as new and desire to secure by Letters Patent—

The employment of one or more fruit-drying sections in combination with the regulating-diaphragm, substantially in the manner and for the purpose herein shown and described.

ADAM SNYDER.

Witnesses:
BASIL MEEK,
WM. H. GALE.